United States Patent
Hirdina et al.

(10) Patent No.: US 11,084,201 B2
(45) Date of Patent: Aug. 10, 2021

(54) PLANT AND METHOD FOR PROCESSING PLASTIC PREFORMS WITH PNEUMATIC CONVEYOR OR TRANSPORT SHUTTLE

(71) Applicant: KRONES AG, Neutraubling (DE)

(72) Inventors: Jochen Hirdina, Regensburg (DE); Bernhard Duenzinger, Schierling (DE)

(73) Assignee: KRONES AG

( * ) Notice: Subject to any disclaimer, the term of this patent is extended or adjusted under 35 U.S.C. 154(b) by 296 days.

(21) Appl. No.: 16/082,239

(22) PCT Filed: Jan. 2, 2017

(86) PCT No.: PCT/EP2017/050012
§ 371 (c)(1),
(2) Date: Sep. 4, 2018

(87) PCT Pub. No.: WO2017/148597
PCT Pub. Date: Sep. 8, 2017

(65) Prior Publication Data
US 2020/0290260 A1    Sep. 17, 2020

(30) Foreign Application Priority Data
Mar. 2, 2016   (DE) ............ 10 2016 103 756.7

(51) Int. Cl.
*B29C 49/42*    (2006.01)
*B29C 49/06*    (2006.01)
(Continued)

(52) U.S. Cl.
CPC .......... *B29C 49/4205* (2013.01); *B29C 49/06* (2013.01); *B29C 49/78* (2013.01);
(Continued)

(58) Field of Classification Search
CPC .......... B29C 2049/067; B29C 49/4205; B29C 2049/023; B29C 2049/4215
See application file for complete search history.

(56) References Cited

U.S. PATENT DOCUMENTS 5,304,027 A     4/1994   La Barre et al. ............. 414/331
5,567,091 A *  10/1996   Johnson ............... B65G 47/648
                                                             406/182

(Continued)

FOREIGN PATENT DOCUMENTS

AT              45911       9/1989  ............ B29C 49/02
CN         101432209        5/2000  ............ B65G 47/51
(Continued)

OTHER PUBLICATIONS

Chinese Office Action (w/translation) issued in application No. 2017800142339, dated Dec. 3, 2019 (31 pgs).
(Continued)

*Primary Examiner* — Robert B Davis
(74) *Attorney, Agent, or Firm* — Hayes Soloway P.C.

(57) ABSTRACT

Plant for processing plastic preforms, includes an injection-moulding machine for producing the plastic preforms, a sterile blow-moulding machine for forming the plastic preforms into plastic containers, and a transport system for transporting, at least partially and/or in portions, the produced plastic preforms from the injection-moulding machine to the blow-moulding machine, wherein during transport, the plastic preforms can be guided in particular at a mouth region of the plastic preforms. The transport system includes a sterile pneumatic conveyor or a plurality of transport shuttles, in particular magnetic shuttles, and the plastic preforms are transported from the injection-moulding machine to the blow-moulding machine by the sterile pneumatic conveyor or magnetic shuttle.

12 Claims, 4 Drawing Sheets

(51) Int. Cl.
    *B29C 49/02*     (2006.01)
    *B29C 49/78*     (2006.01)
    *B65G 51/02*     (2006.01)
    *B65G 54/02*     (2006.01)
    *B29L 31/00*     (2006.01)

(52) U.S. Cl.
    CPC ............. *B65G 51/02* (2013.01); *B65G 54/02* (2013.01); *B29L 2031/712* (2013.01); *B65G 2201/0244* (2013.01)

(56) References Cited

U.S. PATENT DOCUMENTS

| | | | | |
|---|---|---|---|---|
| 5,842,818 A * | 12/1998 | Simkowski | ......... | B65G 47/715 406/88 |
| 6,156,258 A * | 12/2000 | Takada | .................. | B29C 45/42 264/531 |
| 6,428,304 B1 * | 8/2002 | Sartor | ................ | B29C 45/0416 264/537 |
| 6,514,015 B1 * | 2/2003 | Trenel | .................. | B65G 51/035 406/83 |
| 7,318,722 B2 | 1/2008 | Drysdale | ............. | B29C 49/42 |
| 8,153,048 B2 | 4/2012 | Imatani et al. | ......... | B29C 49/08 |
| 8,506,869 B2 | 8/2013 | Lappe et al. | ............ | B29C 49/68 |
| 9,211,671 B2 | 12/2015 | Voth et al. | .............. | B29C 49/64 |
| 9,283,709 B2 | 3/2016 | Lindner et al. | ..... | B29C 49/6409 |
| 9,809,392 B2 | 11/2017 | Walter et al. | ......... | B65G 37/02 |
| 2006/0269648 A1 | 11/2006 | Drysdale | ............ | B29C 49/4205 425/537 |
| 2009/0077933 A1 | 3/2009 | Backhaus et al. | ............. | 53/561 |
| 2011/0298145 A1 * | 12/2011 | Lappe | .................... | B29C 49/78 264/40.1 |
| 2012/0260955 A1 | 10/2012 | Winzinger | ....................... | 134/43 |
| 2013/0056913 A1 * | 3/2013 | Forsthoevel | ............ | B29C 49/06 264/535 |
| 2015/0068958 A1 * | 3/2015 | Tanner | ................ | B29C 49/4236 209/577 |
| 2015/0079220 A1 * | 3/2015 | Lindner | ............. | B29C 49/6409 425/526 |
| 2016/0214799 A1 * | 7/2016 | Walter | .................. | B65G 43/10 |

FOREIGN PATENT DOCUMENTS

| | | | |
|---|---|---|---|
| CN | 1129521 | 12/2003 | ............ B29C 49/06 |
| CN | 1867443 | 11/2006 | ............ B29C 49/64 |
| CN | 102310556 | 1/2012 | ............ B29C 49/78 |
| CN | 102730415 | 10/2012 | ............ B29C 49/42 |
| CN | 104309102 | 1/2015 | ............ B29C 49/42 |
| DE | 69301485 | 6/1996 | ............ B65G 29/02 |
| DE | 102009015519 | 10/2010 | ............ B29C 49/42 |
| DE | 102013218403 | 3/2015 | ............ B65G 43/10 |
| DE | 102014102630 | 8/2015 | ............ B65G 17/42 |
| EP | 0540905 | 10/1992 | ............ B65G 47/51 |
| EP | 2511205 | 10/2012 | ............... B29C 4/42 |
| WO | WO 9608356 | 3/1996 | ............ B29C 49/28 |
| WO | WO0006356 | 2/2000 | ............ B29C 31/08 |

OTHER PUBLICATIONS

German Search Report (w/machine translation) issued in application No. 10 2016 103 756.7, dated Nov. 23, 2016 (16 pgs).
International Preliminary Report on Patentability (w/translation) issued in application No. PCT/EP2017/050012, dated Sep. 4, 2018 (15 pgs).
International Search Report and Written Opinion (w/translation) issued in application No. PCT/EP2017/050012, dated Apr. 25, 2017 (22 pgs).
Chinese Official Action (w/translation) issued in application No. 201780014233.9, dated Nov. 4, 2020 (62 pgs).
EPO Official Action (w/translation) issued in application No. 17700033.8, dated Nov. 18, 2020 (15 pgs).

* cited by examiner

PLANT AND METHOD FOR PROCESSING PLASTIC PREFORMS WITH PNEUMATIC CONVEYOR OR TRANSPORT SHUTTLE

BACKGROUND OF THE INVENTION

The present invention relates to a plant and a method for processing plastic preforms. It is known to produce plastic preforms by means of an injection-moulding machine, and then to form the plastic preforms into plastic containers in a blow-moulding machine, by means of a stretch blow-moulding process and/or a blowing process.

In the prior art, it is common not to link the preform production (injection-moulding process) with the container production (stretch blow-moulding process, blowing process), so that these processes usually take place locally and chronologically separately from each other. After the preforms have been produced, they are usually stored as bulk goods and separated again via a sorting device by or before the container production and then supplied to the blow-moulding machine. Consequently, after production, it is necessary firstly to temporarily store the plastic preforms and then to transport them from the storage to the blow-moulding machine so that the plastic preforms can be formed into plastic containers.

This transport and storage of the plastic preforms as bulk goods however leads to the risk of damage to the plastic preforms, and also additional storage and logistic costs incur. Also, the absence of linking of the injection-moulding machine to the blow-moulding machine, and the therefrom resulting necessary storage as bulk goods, means that the storage period of the individual plastic preforms varies, in particular since by a storage as bulk goods it is not proceeded by the FIFO (first in-first out) principle, which again has negative effects on the stretch blow-moulding process. In particular, this means that the plastic preforms have different starting conditions for the stretch blow-moulding process or blow-moulding process since, for example, the sterility of the plastic preforms created by the injection-moulding process is lost again, and also heat provided by the injection-moulding process inside the plastic preforms is lost again during storage and therefore must be supplied again before forming. Local and chronological separation of the injection-moulding machine and blow-moulding machine therefore leads to increased effort for forming containers from the preforms, since additional transport paths, additional storage, and re-sterilisation and heating of the preforms are required before the blow-moulding starts.

Furthermore, the usual sorting devices known from the prior art which sort or align the plastic preforms, present as bulk goods, before entry into the blow-moulding machine, have a high susceptibility to fault.

SUMMARY OF THE INVENTION

The present invention is therefore based on the object of providing a plant and a method which avoid the above-mentioned disadvantages and which transport the plastic preforms directly after production from an injection-moulding machine to a blow-moulding machine without the need for temporary store the produced plastic preforms. Preferably, a sterile blow-moulding machine should be used.

A plant according to the invention for processing plastic preforms comprises an injection-moulding machine for producing the plastic preforms, a sterile blow-moulding machine for forming the plastic preforms into plastic containers, and a transport system for transporting, at least partially and/or in portions, the produced plastic preforms from the injection-moulding machine to the blow-moulding machine. During transport, the plastic preforms are guided in particular at a mouth region of the plastic preforms.

According to the invention, the transport system comprises a sterile pneumatic conveyor or a plurality of transport shuttles, in particular magnetic shuttles, and the plastic preforms are transported from the injection-moulding machine to the blow-moulding machine by the sterile pneumatic conveyor or magnetic shuttle.

Advantageously, the transport system comprises a clean room inside which the plastic preforms can be transported from the injection-moulding machine to the blow-moulding machine. This clean room is advantageously formed as a channel and surrounds the transport system at least partially and preferably completely. The clean room is delimited from the environment preferably by several walls. Preferably, the plastic preforms are transported from the injection-moulding machine to the blow-moulding machine at least partially inside this clean room.

The use of a pneumatic conveyor or transport shuttle for transporting the plastic preforms minimises the number of gripper devices required for transport, which would otherwise require additional sterilisation. Also, in comparison with conventional gripper clamps, a pneumatic conveyor or a transport shuttle suffers less abrasion and wear, so that the maintenance costs can also be reduced.

Preferably, the transport system is configured such that it can change and/or adapt arbitrarily the distance or pitch between individual plastic preforms. Thus in the case of the pneumatic conveyor, it is conceivable that the plastic preforms are conveyed directly behind one another. If magnetic shuttles are used, it is conceivable that these are controlled independently of each other. In this way, the transport line can be shortened, and with it also the clean room between the injection-moulding machine and blow-moulding machine.

Advantageously, it is also conceivable that the entire region between the injection-moulding machine and the blow-moulding machine, or at least the region in which the plastic preforms are transported, comprises aseptic conditions so that contamination of the plastic preforms with germs and bacteria can be prevented. Preferably, the plastic preforms are already produced under aseptic conditions in the injection-moulding machine, or are at least sterilised after production while still inside the injection-moulding machine. Furthermore, it would also be possible that the plastic preforms are sterilised only before entry into the pneumatic conveyor or before handover to the transport shuttles. To this end, advantageously a sterilisation device may be arranged between the injection-moulding machine and the transport system.

In the prior art, it is common to produce the plastic preforms off-line, i.e. as already stated, not to link this with production of the plastic containers. Consequently, normally the preforms are moulded off-line, which however entails the disadvantage that the plastic preforms must be threaded after production. There is also the risk that they may be damaged during transport, so that a further inspection for any defects must be performed.

It is therefore also proposed that the above disadvantages and problems are eliminated already during production of the plastic preforms. To produce the plastic preforms, it is proposed to inject the preforms in moulds which are similar to the stretch blow-moulds. Advantageously, these injection moulds, which preferably circulate on an injection-moulding carousel of the injection-moulding machine, consist at least of a base region with gating, two clamps in each case for the side wall and for the thread or mouth respectively in order to open and close the mould, and a core with a lift unit, curve or linear motor.

An extruder which transports the liquid plastic granulate to the injection mould may advantageously be a large static extruder which supplies all injection moulds, or a circulating individual extruder which supplies an individual injection mould or a group of moulds comprising several injection moulds.

Advantageously, a possible sequence of the injection-moulding process may comprise at least one or more of the following steps: cleaning of the injection moulds; application of a mould separator and/or slip agent to the inside walls of the injection moulds; closing of the in each case two clamps on the side walls and at the mouth of the injection mould; supplying the core and supplying the injection nozzle to the gating in the bottom region of the injection mould; tempering the injection mould to the temperature required for the injection-moulding process; laying down; injecting the liquid plastic granulate into the mould; tempering; core extraction; opening of the two clamps on the side walls; lowering/detaching the injection nozzle from the mould; transferring the plastic preform to gripper devices for the steps following the injection-moulding process; opening the two clamps at the mouth.

With this procedure, in particular due to the direct handover of the plastic preforms to the gripper device after production, there is no need to thread the plastic preforms after production, as necessary in the prior art, so that in particular damage from transport can be reduced.

After production therefore, the plastic preforms are advantageously arranged in a sterile mould so the effort of subsequent sterilisation can be reduced.

In a further advantageous embodiment, between the injection-moulding machine and the blow-moulding machine, a region is provided in which the plastic preforms are tempered and in particular held at a temperature necessary for the blow-moulding process. Thus no additional or renewed heating of the preforms before the blow-moulding process is required, since these are already tempered throughout the entire transport. Preferably, the above-mentioned sterile room or clean room is formed in the tempered region. Advantageously, the sterile room is maintained by the tempering itself.

In a further advantageous embodiment, in addition an oven or small heating module may be provided which is advantageously arranged downstream of the blow-moulding machine. This oven reheats the plastic preforms if required and brings them to a blowing temperature before they reach the blow-moulding machine. Since the plastic preforms already have a high temperature from the injection-moulding machine and from the tempered region, this oven or heating module may be formed significantly smaller than an oven known from the prior art, since the plastic preforms need no longer be heated for such a long time. Preferably, the heating module is configured as a sterile heating module.

Preferably, a plurality of plastic preforms is arranged in an injection-moulding tool at an extraction station from the injection-moulding machine. Preferably, these plurality of plastic preforms can be handed over individually by means of a handling device to a single strand of a transport line of the pneumatic conveyor or shuttle, so that the plastic preforms can be transported individually to the blow-moulding machine. The handling device here preferably comprises at least one switchable gripper and/or at least one switchable switch. In particular, during transport, the switchable gripper grips the plastic preforms at the mouth region of the plastic preforms, in particular below a carrier ring of the plastic preforms. The gripper may preferably be driven electrically, magnetically or hydraulically.

Advantageously, the plastic preforms are gripped from the injection-moulding machine or injection carousel in a similar manner to the gripping, known in the prior art, of the plastic containers from the blow-moulding machine or stretch blow-moulding machine.

Advantageously, it is also conceivable that the plastic preforms are transported from the injection-moulding machine to the transport line of the pneumatic conveyor by transport mandrels which engage in the mouths of the plastic preforms, preferably during transport thereof, and thus hold the preforms.

Consequently, a connection is created between the injection-moulding machine and the blow-moulding machine, so that the plastic preforms produced in the injection-moulding machine enter the blow-moulding machine in which they are formed into plastic containers immediately after production, without intermediate storage and in particular without storage as bulk goods.

In particular, after production, a plurality of finished plastic preforms is arranged in a matrix pattern inside the injection-moulding tool, at the extraction station from the injection-moulding tool, and is extracted from this matrix-like arrangement via the switchable gripper and/or the switchable switch. Accordingly, the injection-moulding machine and blow-moulding machine are advantageously connected together by the (sterile) transport system and/or the switchable gripper and/or the switchable switch. The gripper is in particular configured such that it can be adapted to different preform diameters without needing to be exchanged.

In particular, the plastic preforms are extracted from the extraction station following the FIFO principle, so that the plastic preforms which were produced first in the injection-moulding machine are also the first to be taken from the extraction station. Accordingly, the plastic preforms are subject all to the same starting conditions for the blowing process, since the duration between production and handover to the blow-moulding machine is the same for all plastic preforms.

In an advantageous embodiment, it is therefore proposed that the plastic preforms are handed over from the injection-moulding tool to the transport line or transport system, and thus introduced into the blow-moulding machine, on the FIFO principle.

In an advantageous embodiment of the plant, a separating unit for separating out defective plastic preforms, and/or a buffer unit for temporary storage of the plastic preforms, and/or a monitoring unit for inspection of the plastic preforms, is arranged between the injection-moulding machine and the blow-moulding machine.

Advantageously, the separating unit comprises a preform shredder which immediately destroys the defective, extracted plastic preforms. In particular, the destroyed preforms may then be supplied to a plastic recycling plant so that the plastic material of the destroyed preforms may be reused for production of new plastic preforms in the injection-moulding machine. Advantageously, the plastic preforms are separated out individually. Preferably, also, an ejector wheel may be provided which is arranged upstream of the separating unit and collects the defective plastic preforms, and from which the preforms are transferred to the separating unit, for example by means of at least one further gripper or also at least one further shuttle.

Preferably, the monitoring unit is connected upstream of the separating unit and is preferably arranged between the injection-moulding machine and the separating unit, and advantageously inspects the finished preforms produced in the injection-moulding machine. In particular, the monitoring unit inspects the mouth, the base and/or the contour of the preform, and preferably inspects the side walls, the colour and/or also the wall thickness. The plastic preforms may advantageously be inspected optically by means of an optical inspection device. The optical inspection device may in particular comprise an optical sensor, an image recording device or similar.

The intermediate storage of the plastic preforms in the buffer unit in particular serves to bridge faults in the injection-moulding machine and/or the blow-moulding machine. If for example a fault occurs in the blow-moulding machine, production of the plastic preforms in the injection-moulding machine may continue and the plastic preforms produced may be stored in the buffer unit until the fault on the blow-moulding machine has been eliminated. Advantageously, it is also possible that a specific number of plastic preforms is always stored in the buffer unit, so that on a fault in the injection-moulding machine, the forming of the plastic preforms inside the blow-moulding machine need not be stopped and can continue independently of this fault.

The buffer unit may advantageously also serve for at least partial storage of the first plastic preforms to be approved by the monitoring unit, so as to allow flexible filling of gaps in a stream of plastic preforms. These gaps in the preform stream occur in particular due to extraction of preforms which have been detected as faulty. Preferably, the preforms arranged in the buffer then close these gaps again, in that a gap created by a defective preform is filled with a fault-free preform which was stored in the buffer unit.

In the prior art, it was previously usual not to refill these gaps which occur in particular due to defective preforms, so that these gaps are retained throughout the further process and hence through all subsequent treatment stations.

Therefore, in an advantageous embodiment, it is proposed that the first as good identified plastic preforms are extracted from the transport line by a transport shuttle, in particular a magnetic shuttle, and supplied to the buffer unit. Preferably, this continues until the buffer is completely filled. Advantageously, the buffer may be also filled gradually during production. Preferably, the buffer itself is also configured so as to be sterile, and/or advantageously comprises a sterilisation device.

Advantageously, not only the buffer is filled using the magnetic shuttle, but the gaps are also closed using the magnetic shuttle. If a gap is produced due to extraction of a defective plastic preform, a magnetic shuttle starts and in a targeted manner feeds a preform from the buffer to the corresponding point in the preform stream. Advantageously, the entire region of the plant including the buffer is tempered so that the preforms always remain at the correct temperature for the blow-moulding process. In this way, the process or processes of plastic preform production and plastic container production are substantially optimised, perfected and improved.

In a further advantageous embodiment, it is also conceivable that the plastic preforms are inspected for defects immediately after production while still inside the injection-moulding machine, and transferred to the separating unit by means of the gripper immediately after extraction from the injection-moulding machine.

In a further preferred embodiment, the plant comprises a control unit which, on a fault in the blow-moulding machine, controls the plant depending on a duration, in particular a temporal duration of this fault. Consequently, if the fault is of comparatively short temporal duration, the plastic preforms are buffered on the transport system before entering the blow-moulding machine. If the fault is of moderate temporal duration, the plastic preforms already taken from the injection-moulding machine are destroyed, in particular shredded in the separating unit. On a fault of long temporal duration however, production in the injection-moulding machine is completely interrupted.

It would also be possible for the measures described here to be taken successively.

A fault of short temporal duration is in particular a fault lasting 1 to 10 minutes, preferably a fault lasting 1 to 5 minutes. A moderate fault in particular lasts for 5 to 30 minutes, preferably 5 to 20 minutes. A long fault is in particular a fault which is sustained for a duration of more than 30 minutes, preferably more than 20 minutes. The aim of the control unit responding according to the duration of the fault is that the number of plastic preforms already produced and destroyed or separated out is kept as low as possible, and production in the plant parts upstream of the blow-moulding machine can continue unhindered for as long as possible.

In a further advantageous embodiment, a filler and/or a closer and/or a packing machine is arranged after the blow-moulding machine. In particular, the plastic containers are transported from the blow-moulding machine to the filler and/or the closer and/or the packing to machine via at least one further sterile pneumatic conveyor or at least one further transport shuttle, so that preferably a complete production process takes place, in particular on one process line, starting from production of the plastic preforms through to packing of the filled and closed plastic containers, without interruption due to storage and/or transport.

The present invention is furthermore aimed to a method for processing plastic preforms, comprising an injection-moulding machine in which the plastic preforms are produced, a sterile blow-moulding machine in which the plastic preforms are formed into plastic containers, and a transport system which transports the produced plastic preforms from the injection-moulding machine to the blow-moulding machine. During transport, the plastic preforms are guided in particular at a mouth region of the plastic preforms.

According to the invention, the transport system is a sterile pneumatic conveyor through which a sterile gaseous medium flows, or a plurality of transport shuttles, in particular magnetic shuttles, wherein each shuttle receives at least one plastic preform in order to transport this from the injection-moulding machine to the blow-moulding machine, and wherein during transport, the plastic preforms are transported inside a clean room of the transport system. The sterile gaseous medium of the pneumatic conveyor is advantageously hydrogen peroxide ($H_2O_2$) or peracetic acid. However, all other gaseous and liquid media suitable for sterilisation or maintaining sterile conditions are possible.

Advantageously, this gaseous medium also forms the above-mentioned clean room, in particular the gaseous medium is inside the clean room. Preferably, the clean room is maintained or kept sterile by the gaseous medium.

In an advantageous method, a plurality of plastic preforms is arranged in an injection-moulding tool at an extraction station of the injection-moulding machine, and these are handed over individually to a single strand of a transport line of the transport system before entry into the blow-moulding machine. In particular, the plurality of plastic preforms is arranged in a matrix pattern in the extraction station of the injection-moulding machine.

In a further advantageous method, a switchable gripper and/or a switchable switch guides the plastic preforms onto the single strand of the transport line of the transport system before entry into the blow-moulding machine.

In an advantageous method, the plastic preforms are handed over from the matrix-like arrangement of the injection-moulding tool to the linear transport line of the transport system according to the following concept: A switchable gripper or handling head, for example a robot arm, arranged upstream of the extraction station of the injection-moulding tool, brings the plastic preforms arranged in a matrix pattern into a line. The plastic preforms arranged in a line may then be handed over directly to the transport line, in particular to the single strand of the transport line of the pneumatic conveyor, or onto a transport shuttle. Advantageously, the plastic preforms are held centrally by the switchable gripper so that the complexity of conversion on a type change is low and reproducible.

In a further advantageous method, the plastic preforms are handed over from the matrix-like arrangement of the injection-moulding tool to the linear transport line of the transport system in that the plastic preforms are taken from the injection-moulding tool in a matrix pattern and then deposited in a matrix pattern, in particular on at least three strands of the transport line. Via the transport line of the transport system, the at least three strands are then bundled into a single strand and thus reach the blow-moulding machine individually.

Here again, a switchable gripper is advantageously arranged between the injection-moulding machine and the at least three strands of the transport line, so that this switchable gripper takes the plastic preforms from the extraction station of the injection-moulding machine in a matrix pattern and delivers them to the transport system again in a matrix-like arrangement.

In a further advantageous method, the plastic preforms are handed over from the matrix-like arrangement of the injection-moulding tool to the linear transport line of the transport system in that the plastic preforms are taken from the injection-moulding tool in a matrix pattern and then deposited in a matrix pattern on the at least three strands of the transport line. Via a switchable switch, the at least three strands are then merged into a single strand so that the plastic preforms are supplied to the blow-moulding machine individually. In particular, the switch can be set such that the single strand of the transport line is connected alternately with one of the upstream strands of the transport line.

Here again, advantageously a switchable gripper is arranged between the injection-moulding machine and the at least three strands of the transport line of the transport system, so that in this embodiment, the plastic preforms can be transported from the injection-moulding machine to the blow-moulding machine via a switchable gripper and via a switchable switch.

The invention is furthermore oriented to a pneumatic conveyor, for example a gas conveyor, for transporting plastic preforms from an injection-moulding machine to a blow-moulding machine, wherein a gas stream is formed inside the pneumatic conveyor, and the pneumatic conveyor comprises at least two guide rails which guide the plastic preforms at least during transport to the blow-moulding machine, and a clean room.

According to the invention, the gas stream inside the pneumatic conveyor is mixed with a sterile gaseous medium at least in the region in which the plastic preforms are transported. Advantageously, this gas stream is an air flow which drives the plastic preforms and which is mixed with hydrogen peroxide ($H_2O_2$) or peracetic acid, and/or is filtered in a sterile manner. Advantageously, the entire region of the pneumatic conveyor is mixed with a gaseous medium, in particular gaseous hydrogen peroxide ($H_2O_2$) or gaseous peracetic acid.

Preferably, at least the region in which the plastic preforms are transported has a higher pressure level than a non-sterile environment. This higher pressure level lies in particular more than 2 Pascal, preferably at least 3 Pascal above the ambient pressure. In particular, the entire region of the pneumatic conveyor is subject to a pressure level which is higher than ambient pressure.

In a preferred embodiment of the pneumatic conveyor, the plastic preforms are guided inside the transport line of the pneumatic conveyor at their carrier or closing ring, in that the gas stream formed inside the pneumatic conveyor is preferably controlled such that it acts on a mouth region of the plastic preforms.

The invention is furthermore aimed to a transport shuttle device for transporting plastic preforms from an injection-moulding machine to a blow-moulding machine, with a transport line on which the transport shuttles are mounted so as to slide, and at least one receiver for the plastic preforms, wherein each transport shuttle receives at least one plastic preform.

According to the invention, the transport shuttle is formed as a magnetic shuttle. Advantageously, a plurality of such magnetic shuttles is arranged in the plant, wherein these may be driven or moved through the plant independently of each other. Preferably, the drive for the magnetic shuttles is configured as a long-stator drive, but a short-stator drive is also conceivable. Preferably, each magnetic shuttle has its own drive which can be controlled independently of the others, i.e. the drives of the other shuttles.

In an advantageous embodiment of the transport shuttle, the receiver for the plastic preforms is configured such that the plastic preforms are arranged rotatably on the receiver and consequently rotate during transport. For this, preferably a transport mandrel is arranged on the receiver which engages in a mouth of the plastic preform. In a further advantageous embodiment of the transport shuttle, preferably a rotatable gripper is arranged on the receiver for the plastic preforms and grips the plastic preforms at their mouths.

Preferably, the plastic preform is already arranged on a transport shuttle after production, advantageously during production in the injection moulding machine, so that the plastic preform is arranged on the transport shuttle along the entire transport path through the complete plant as far as the blow-moulding machine. In this case, it is no longer necessary to transfer the plastic preform during transport through the plant, in particular transfer it to another transport device.

BRIEF DESCRIPTION OF THE DRAWINGS

Further advantages and embodiments arise from the attached drawings.

The drawings show.

DETAILED DESCRIPTION OF THE INVENTION

Figure 1:
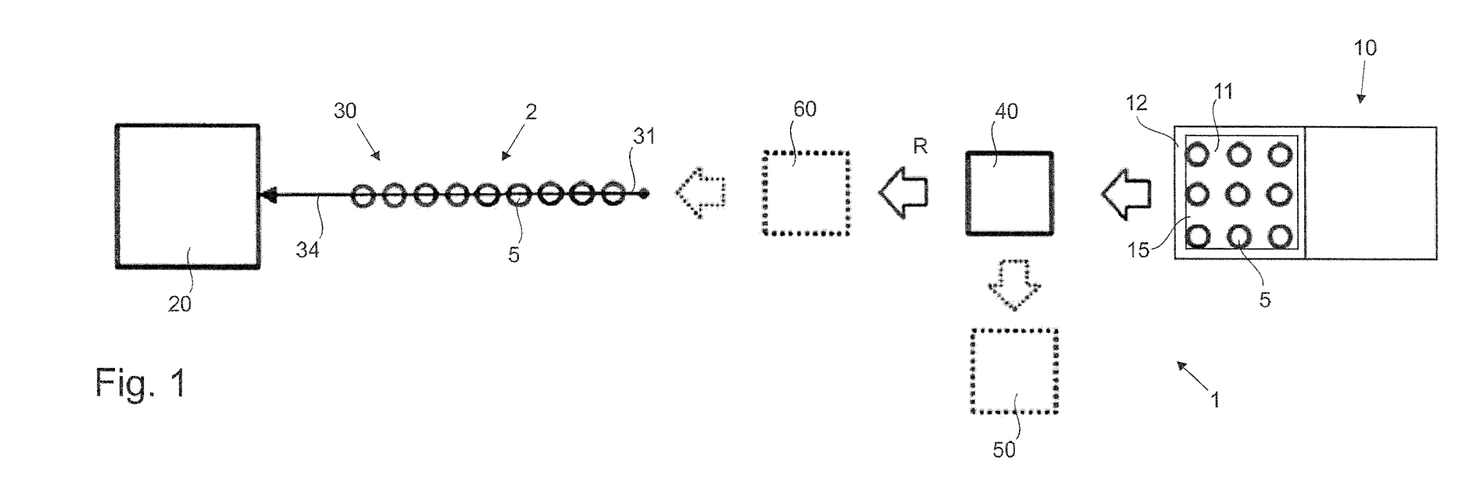
FIG. 1 a diagrammatic depiction of a plant according to the invention for processing plastic preforms.

FIG. 1 shows a diagrammatic depiction of an embodiment according to the invention of a plant 1 for processing plastic preforms 5. The figure shows an extraction station 12 of an injection-moulding machine 10 for producing the plastic preforms 5. A plurality of plastic preforms 5 is arranged in the extraction station 12, in particular in a matrix pattern, in an injection-moulding tool 11. A handling device 40 takes the finished plastic preforms 5 from this matrix-like arrangement 15 and supplies them to a single strand 31 of a transport line 34 of a pneumatic conveyor 30, which then transports the plastic preforms individually to a blow-moulding machine 20 in which the plastic preforms are formed into plastic containers (not shown). Advantageously, the plant 1 also has a separating unit 50 and/or a buffer unit 60 between the injection-moulding machine 10 and the blow-moulding machine 20. Preferably, a sterilisation device (not shown) for sterilising the plastic preforms is also provided between the injection-moulding machine and the blow-moulding machine. In particular, in addition parts or components of the handling device could also be sterilised with this sterilisation device.

Reference sign 2 designates a clean room or sterile room which surrounds the transport system or transport line so that the preforms can be transported under sterile conditions.

Preferably, the clean room surrounds the pneumatic conveyor or transport shuttle. Advantageously, it is also conceivable that the clean room is also mixed with the gaseous medium of the pneumatic conveyor, whereby sterile conditions are created inside the clean room.

The separating unit 50 serves in particular to separate out defective plastic preforms. To this end, the separating unit 50 may also have a preform shredder which destroys the extracted, defective preforms. Furthermore, a monitoring unit (not shown) for inspecting the preforms may be provided between the injection-moulding machine 10 and the separating unit 50. Advantageously, the material of these destroyed plastic preforms is then supplied to a plastic recycling plant (not shown). The plastic preforms already present in the handling device 40 may be temporarily stored in the buffer unit 60 if a fault occurs in the downstream blow-moulding machine. It is also conceivable that a specific number of plastic preforms is always stored in the buffer unit 60, so that on a fault in the injection-moulding machine 10, the forming of the plastic preforms 5 into plastic containers can continue in the blow-moulding machine 20. Preferably, the plastic preforms are supplied to the corresponding unit by means of the handling device 40. Reference sign R designates the transport direction of the plastic preforms from the injection-moulding machine to the blow-moulding machine. The transferring of the plastic preforms from the injection-moulding machine to the conveyor line 34, and hence their entry into the blow-moulding machine follows the FIFO principle.

Figure 2:
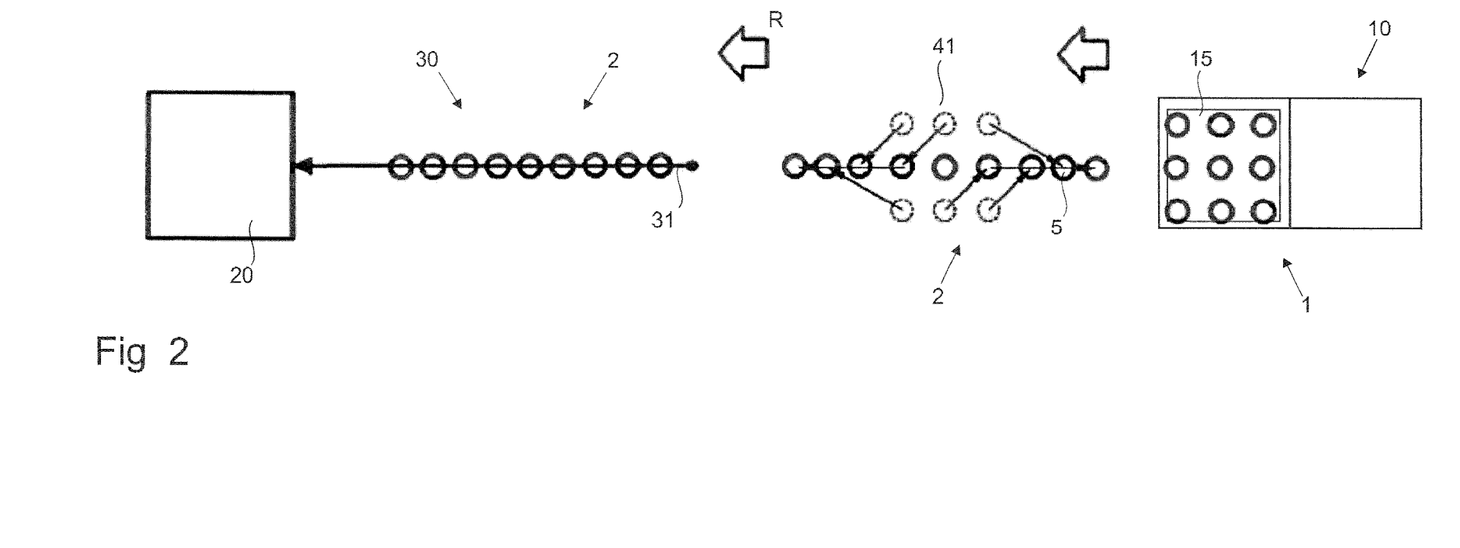
FIG. 2 a diagrammatic depiction of a first embodiment according to the invention of a plant for processing plastic preforms.

FIG. 2 shows a depiction of a first embodiment according to the invention of a plant 1 for processing plastic preforms 5. Here again, the injection-moulding machine 10 for producing the plastic preforms 5, the blow-moulding machine 20 for forming the plastic preforms 5 into plastic containers, and the transport system 30 arranged between the injection-moulding machine 10 and the blow-moulding machine 20, can be seen. Reference sign 41 designates a switchable gripper, in particular a handling device, which takes the plastic preforms from the matrix-like arrangement 15 of the injection-moulding tool 10 and arranges the preforms in a line. The plastic preforms 5 are then transported to the single strand 31 of the transport line 34 of the transport system 30 and guided individually into the blow-moulding machine 20.

Figure 3:
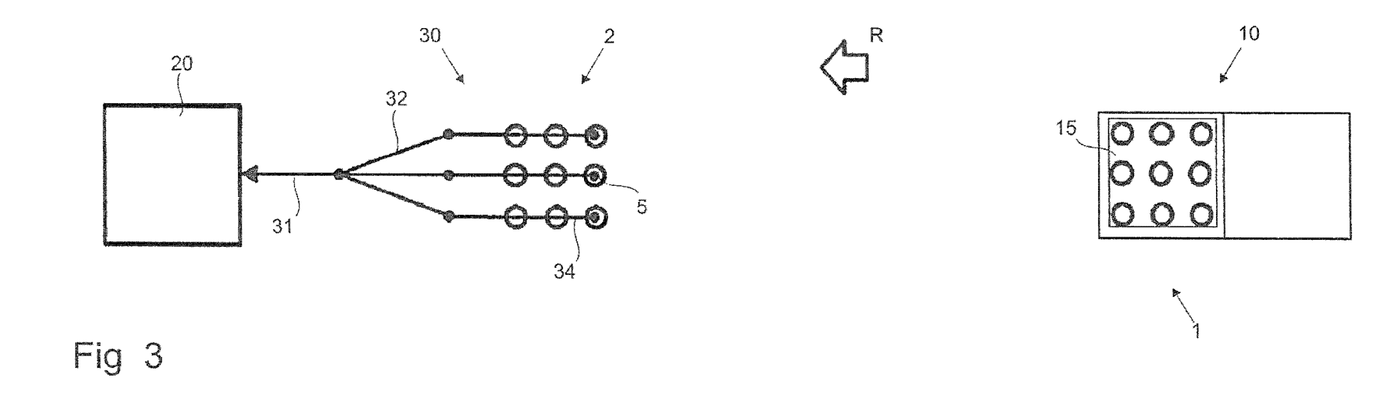
FIG. 3 a diagrammatic depiction of a second embodiment according to the invention of a plant for processing plastic preforms.

FIG. 3 shows a second embodiment according to the invention of a plant 1 for processing plastic preforms 5. In this embodiment, the transport line 34 of the transport system 30 comprises at least three strands 32 which run together into a single strand 31 before the inlet into the blow-moulding machine. The plastic preforms are taken from the matrix-like arrangement 15 of the extraction station 12 and delivered in a matrix pattern on at least three strands 32 of the transport line 34, wherein the at least three strands 32 run together into a single strand 31 so that the plastic preforms 5 are again supplied individually to the blow-moulding machine. The plastic preforms 5 may again be taken from the matrix-like arrangement 15 by means of the switchable gripper.

Figure 4:
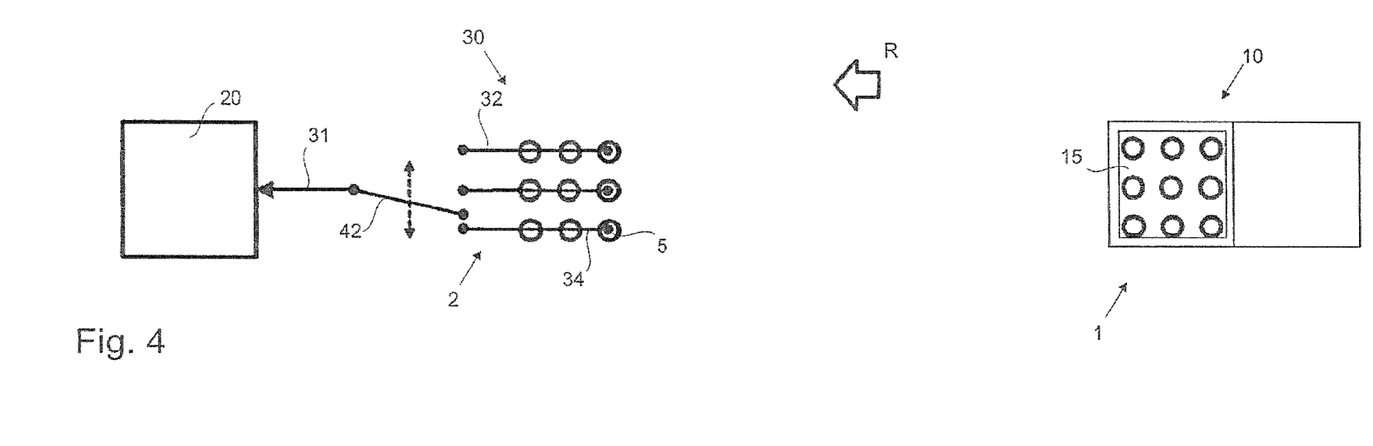
FIG. 4 a diagrammatic depiction of a further embodiment according to the invention of a plant for processing plastic preforms.

FIG. 4 shows a further depiction of an embodiment according to the invention of the plant 1 for processing plastic preforms 5. Here, the transport line 34 of the transport system 30 again has at least three strands 32 which run together into a single strand 31 before the inlet into the blow-moulding machine 20. The plastic preforms are accordingly again delivered in a matrix pattern to the at least three strands 32 of the transport line 34. A switchable switch 42, which in particular is connected alternately to each respective strand 32 of the transport line 34, guides the plastic preforms individually to the single strand 31 and hence individually to the blow-moulding machine 20. Here again, it is also conceivable that advantageously, for extracting the plastic preforms 5 from the matrix-like arrangement 15, again the switchable gripper is arranged between the injection-moulding machine 10 and the strands 32 of the transport line.

It is furthermore evident from FIGS. 1 to 4 that the matrix-like arrangement 15 at the extraction station 12 of the injection-moulding machine 10 is configured such that at least nine plastic preforms can be received. It is also conceivable that the matrix-like arrangement can be adapted to various circumstances so that, if necessary or desired, more or fewer plastic preforms than shown may be received.

Figure 5:
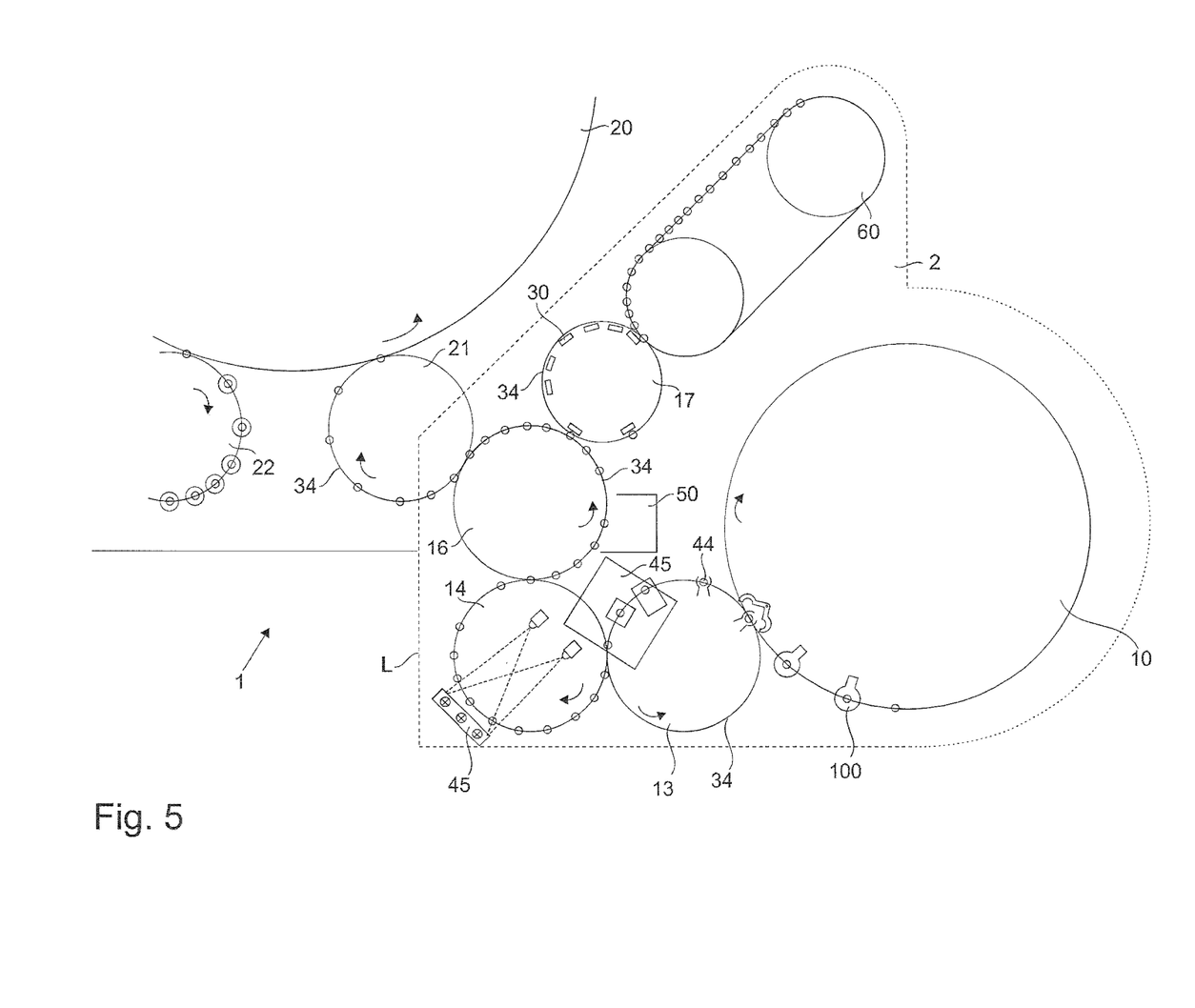
FIG. 5 a depiction of a further plant according to the invention.

FIG. 5 shows a depiction of a further embodiment according to the invention. According to this embodiment, the transport line is formed by several transport stars or transport wheels. The dotted line L here designates a region which forms a tempered region, so that after the injection-moulding process, the plastic preforms are held at the temperature necessary for the blow-moulding process. Reference sign 2 again designates the clean room or sterile room which allows sterile transport of the preforms.

The plastic preforms are produced in the injection-moulding machine 10 and after production, taken from the injection-moulding machine 10 with a gripper device 44 which is arranged on an extraction wheel 13. Advantageously, a plurality of such gripper devices 44 is arranged at the extraction wheel 30. Advantageously, a monitoring unit 45 in which an inspection of the mouth and base of the plastic preform is carried out while the preform is still arranged in the gripper device 44 may already be arranged on the extraction wheel 13. Preferably, the plastic preforms identified as defective may already be ejected here.

The gripper devices 44 then deliver the plastic preforms to a transport mandrel (not shown), so called mandrel handling, which is arranged on a monitoring wheel 14. This monitoring wheel 14 also contains a monitoring unit 45, wherein here the side wall and colour of the plastic preforms are inspected. Advantageously, the monitoring unit 45 is therefore formed by the extraction wheel 13 and the monitoring wheel 14.

A separating wheel 16 which separates out the preforms which have been detected as faulty by the monitoring unit 45 into a separating unit 50, is connected downstream of the monitoring wheel 14. In contrast, the first as good identified plastic preforms are handed over to the handover wheel 17. In this handover wheel 17, the plastic preforms are transported by transport shuttles 30, and in particular magnetic shuttles, to a buffer unit 60 in which the preforms are stored or temporarily stored. The fault-free preforms are transported to the buffer unit 60 until the buffer is completely filled.

The plastic preforms deposited in the buffer unit 60 serve in particular to refill gaps occurring in the on-going process which are caused in particular by the extraction of defective preforms in the separating unit 50. For this, the transport shuttle 30 takes a preform from the buffer unit 60 and delivers it to the corresponding gap in the preform stream from the separating wheel 16.

It is also conceivable that, instead of a transport shuttle, a sterile pneumatic conveyor is present in the handover wheel 17. Preferably, in this embodiment, the plastic preforms are transported by a transport shuttle 30 or a sterile pneumatic conveyor only from the separating wheel 16 to the buffer unit 60, or from the buffer unit 60 to the gap in the preform stream of the separating wheel 16, while further transport takes place with gripper devices and transport mandrels.

It is however also conceivable here that the entire transport line is configured as a pneumatic conveyor, or that, during production in the injection-moulding machine 10, the plastic preform is already arranged on a transport shuttle and is conveyed on this as far as the moulding machine 20.

From the separating wheel 16, the fault-free preforms reach a handover wheel 21 which delivers the plastic preforms to the blow-moulding machine 20. The finished plastic containers produced in the blow-moulding machine are discharged via a discharge device 22 and advantageously delivered to a further treatment station (not shown), for example a filler, a closer and/or a packing station.

Figure 6:
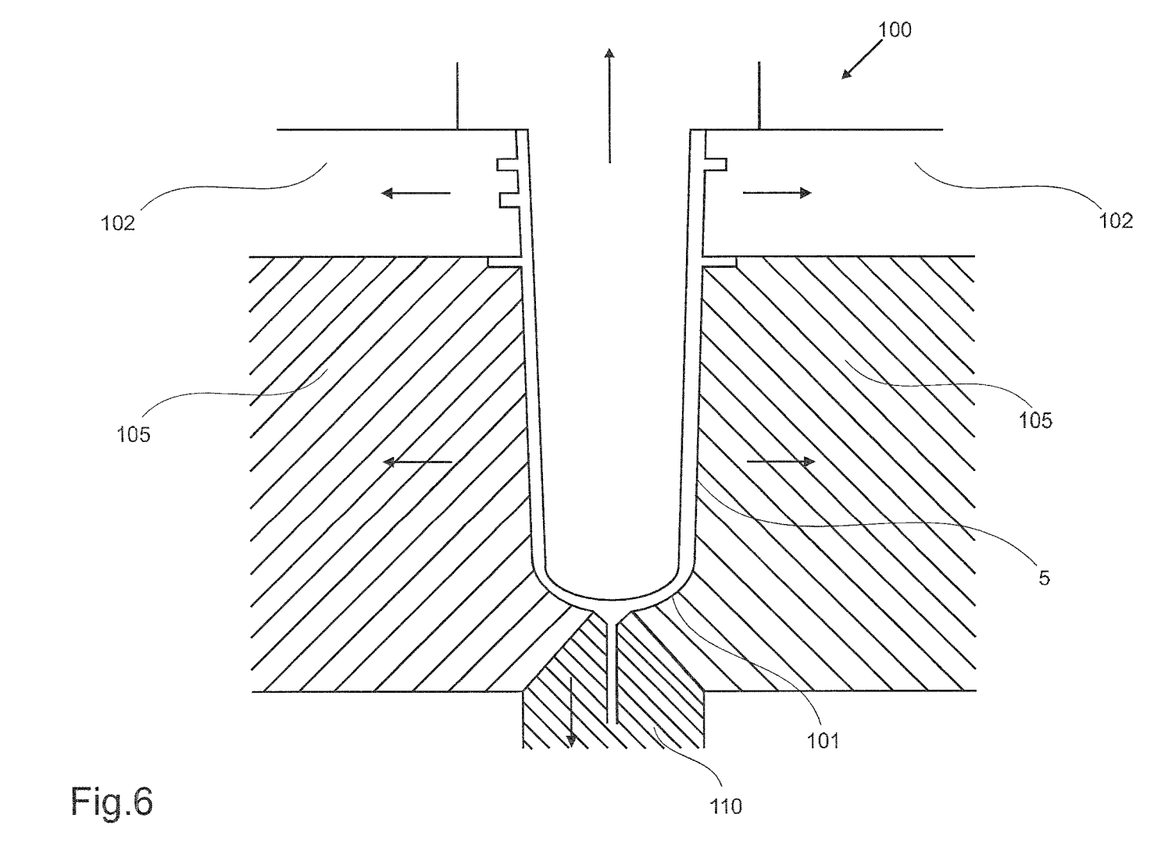
FIG. 6 an injection mould for production of plastic preforms.

FIG. 6 shows an injection mould 100 for production of plastic preforms 5. This shows a bottom region with gating 101 to which the injection nozzle 110 has already been guided for delivering fluid plastic granulate into the injection mould 100. Furthermore, in each case two clamps 102, 105 for the mouths and for the side walls are shown. These clamps 102, 105 close the injection mould 100 firmly and open it again after production of the plastic preforms 5.

The applicant reserves the right to claim as essential to the invention all features disclosed in the application documents insofar as they are novel in relation to the prior art, either individually or in combination. It is furthermore pointed out that the individual figures also describe features which may be advantageous taken in themselves. The person skilled in the art will immediately gather that a specific feature described in one figure may also be advantageous without the use of further features from this figure. Furthermore, the person skilled in the art will recognise that advantages may result from a combination of several features shown in individual or in different figures.

LIST OF REFERENCE SIGNS

1 plant
2 clean room, sterile room
5 plastic preforms
10 injection-moulding machine
11 injection-moulding tool
12 extraction station
13 extraction wheel
14 monitoring wheel
15 matrix-like arrangement
16 separating wheel
17 handover wheel
20 blow-moulding machine
21 handover wheel
22 discharge device
30 transport system, pneumatic conveyor, transport shuttle
31 single strand
32 strands
34 transport line
40 handling device
41 switchable gripper
42 switchable switch
44 gripper device
45 monitoring unit
50 separating unit
60 buffer unit
100 injection mould
101 bottom region with gating
102 clamp for mouth
105 clamp for side wall
110 injection nozzle
L tempered region
R transport direction

The invention claimed is:

1. A plant for processing plastic preforms, comprising an injection-moulding machine for producing the plastic preforms, a sterile blow-moulding machine for forming the plastic preforms into plastic containers, and a transport system for transporting, at least partially and/or in portions, the produced plastic preforms from the injection-moulding machine to the blow-moulding machine, wherein during transport, the plastic preforms can be guided in particular at a mouth region of the plastic preforms,
wherein
the transport system comprises a sterile pneumatic conveyor or a plurality of transport shuttles, and the plastic preforms are transported from the injection-moulding machine to the blow-moulding machine by the sterile pneumatic conveyor or magnetic shuttle, and wherein between the injection-moulding machine and the blow-moulding machine, a region is provided in which the plastic preforms are tempered and held at a temperature necessary for the blow-moulding process, so that no additional or renewed heating of the preforms before the blow-moulding process is required, since these are already tempered throughout the entire transport.

2. The plant according to claim 1,
wherein
a plurality of plastic preforms is arranged in an injection-moulding tool at an extraction station of the injection-moulding machine, wherein the plastic preforms are handed over individually by a handling device to a single strand of a transport line of the transport system so that the plastic preforms can be transported individually to the blow-moulding machine.

3. The plant according to claim 2, wherein the handling device comprises a switchable gripper and/or a switchable switch.

4. The plant according to claim 1, wherein a separating unit for separating out defective plastic preforms, and/or a buffer unit for temporary storage of the plastic preforms, and/or a monitoring unit for inspection of the plastic preforms, is arranged between the injection-moulding machine and the blow-moulding machine.

5. The plant according to claim 4, wherein the buffer unit serves for at least partial storage of the first plastic preforms identified as good by the monitoring unit so as to allow flexible filling of gaps in a stream of plastic preforms.

6. The plant according to claim 4, wherein the first as good identified plastic preforms are extracted from the transport line by a magnetic shuttle and supplied to the buffer unit.

7. The plant according to claim 1, wherein the plant comprises a control unit which, on a fault in the blow-moulding machine, controls the plant depending on a duration of this fault.

8. A method for processing plastic preforms, using an injection-moulding machine in which the plastic preforms are produced, a sterile blow-moulding machine in which the plastic preforms are formed into plastic containers, and a transport system which transports the produced plastic preforms from the injection-moulding machine to the blow-moulding machine, wherein during transport, the plastic preforms are guided in particular at a mouth region of the plastic preforms,
wherein
the transport system is a sterile pneumatic conveyor through which a sterile gaseous medium flows, or a plurality of transport shuttles, wherein each shuttle receives at least one plastic preform in order to transport the plastic preform from the injection-moulding machine to the blow-moulding machine, and wherein during transport, the plastic preforms are transported inside a clean room of the transport system, and wherein between the injection-moulding machine and the blow-moulding machine, a region is provided in which the plastic preforms are tempered and held at a temperature necessary for the blow-moulding process, so that no additional or renewed heating of the preforms before the blow-moulding process is required, since these are already tempered throughout the entire transport.

9. The method according to claim 8, wherein a plurality of plastic preforms is arranged in an injection-moulding tool at an extraction station from the injection-moulding machine, and are handed over individually to an single strand of a transport line of the transport system before the entry into the blow-moulding machine.

10. The method according to claim 9, wherein a switchable gripper and/or a switchable switch guides the plastic preforms onto the single strand of the transport line of the transport system before the entry into the blow-moulding machine.

11. The plant according to claim 1, wherein the transport shuttles comprise magnetic shuttles.

12. The method according to claim 8, wherein the transport shuttle comprise magnetic shuttles.

* * * * *